US012686784B2

(12) United States Patent
Masuko et al.

(10) Patent No.: US 12,686,784 B2
(45) Date of Patent: Jul. 21, 2026

(54) C.I. PIGMENT YELLOW 180, AQUEOUS PIGMENT DISPERSION FOR INK-JET INK, AND AQUEOUS PIGMENT INK

(71) Applicant: DIC Corporation, Tokyo (JP)

(72) Inventors: Issei Masuko, Kamisu (JP); Masaaki Tanaka, Kamisu (JP); Masaki Hosaka, Kamisu (JP); Shingo Saitou, Kamisu (JP); Miyuki Morishita, Kamisu (JP)

(73) Assignee: DIC CORPORATION, Tokyo (JP)

( * ) Notice: Subject to any disclaimer, the term of this patent is extended or adjusted under 35 U.S.C. 154(b) by 723 days.

(21) Appl. No.: 17/801,906

(22) PCT Filed: Jan. 28, 2021

(86) PCT No.: PCT/JP2021/002952

§ 371 (c)(1),
(2) Date: Aug. 24, 2022

(87) PCT Pub. No.: WO2021/199632

PCT Pub. Date: Oct. 7, 2021

(65) Prior Publication Data

US 2023/0095111 A1 Mar. 30, 2023

(30) Foreign Application Priority Data

Apr. 2, 2020 (JP) ................................. 2020-066713

(51) Int. Cl.

| | |
|---|---|
| ***C09D 17/00*** | (2006.01) |
| ***C09D 11/106*** | (2014.01) |
| ***C09D 11/322*** | (2014.01) |
| ***C09D 11/326*** | (2014.01) |

(52) U.S. Cl.

CPC .......... *C09D 17/003* (2013.01); *C09D 11/106* (2013.01); *C09D 11/322* (2013.01); *C09D 11/326* (2013.01)

(58) Field of Classification Search

CPC .. C09D 17/003; C09D 11/106; C09D 11/322; C09D 11/326

USPC .......................................................... 524/190

See application file for complete search history.

(56) References Cited

U.S. PATENT DOCUMENTS

2006/0191441 A1 8/2006 Robertson et al.
2009/0196995 A1 8/2009 Saito et al.
2015/0030825 A1* 1/2015 Ishima ................ C09D 11/326 524/556
2015/0217576 A1* 8/2015 Yatake .................... D06P 1/445 347/21
2017/0009089 A1 1/2017 Ishima et al.
2017/0136782 A1 5/2017 Yatake

FOREIGN PATENT DOCUMENTS

CN 102279522 A 12/2011
CN 104093795 A 10/2014
JP 2003-4938 A 1/2003
JP 2009-67866 A 4/2009
JP 2009-179722 A 8/2009
JP 2014/025008 A 2/2014

OTHER PUBLICATIONS

International Search Report dated Mar. 16, 2021, issued in counterpart International Application No. PCT/JP2021/002952 (3 pages).

* cited by examiner

*Primary Examiner* — Ruiyun Zhang
(74) *Attorney, Agent, or Firm* — WHDA, LLP

(57) ABSTRACT

The aqueous pigment dispersion for IJ inks has excellent dispersion quality as well as high color strength and light fastness and is particularly suited for use as an U aqueous pigment ink. It includes C.I. Pigment Yellow 180, a block copolymer having an acid value of 10 or more and 20 or less and an amine value of 20 or less, and water. The present invention also provides C.I. Pigment Yellow 180 having an aspect ratio of 1.0 to 2.0, a primary particle shorter diameter of 30 to 100 nm, and a crystallite size of 15.0 nm or more as calculated from the Scherrer equation based on the full width at half maximum of a peak A indicated by a maximum diffraction intensity at a diffraction angle $2\theta=6.7\pm0.50$ in a powder X-ray diffraction pattern of diffraction intensities versus $2\theta$ measured using CuK$\alpha$ radiation.

2 Claims, No Drawings

C.I. PIGMENT YELLOW 180, AQUEOUS PIGMENT DISPERSION FOR INK-JET INK, AND AQUEOUS PIGMENT INK

TECHNICAL FIELD

The present invention relates to an aqueous pigment dispersion for ink-jet (hereinafter, written as "IJ") inks, and to an aqueous pigment ink.

BACKGROUND ART

IJ printers are widely used not only domestically but also in industrial applications in reaction to the shift to smaller printing lots. In recent years, the business has even expanded to textile applications and even to flexible packaging applications. In particular, yellow inks as well as cyan, magenta and black are dominant and important inks.

Currently, aqueous inks are becoming the mainstream of IJ printer inks, and pigments used in those inks are required to have color strength and light fastness and also to be, for example, dispersed easily.

Conventionally, as yellow pigments used in IJ printers, C.I. Pigment Yellow 74 (hereinafter, written as "Y74") having high color strength, C.I. Pigment Yellow 155 (hereinafter, written as "Y155") having high light fastness, and the like are used frequently (PTLs 1 and 2). However, Y74 has poor light fastness and Y155 is low in color strength. These problems have directed attention to C.I. Pigment Yellow 180 (hereinafter, written as "Y180") as a new yellow pigment with an excellent balance between color strength and light fastness.

CITATION LIST

Patent Literature

PTL 1: Japanese Unexamined Patent Application Publication No. 2009-179722

PTL 2: Japanese Unexamined Patent Application Publication No. 2009-67866

SUMMARY OF INVENTION

Technical Problem

However, Y180 has a drawback in that the dispersibility is very low when the pigment is used in an aqueous pigment dispersion or an aqueous pigment ink. Thus, the development is desired of easily dispersible Y180 having excellent dispersibility, and there are demands for aqueous pigment dispersions and aqueous pigment inks that contain Y180 in an excellently dispersed state. Furthermore, demands are present for Y180 itself that exhibits excellent light fastness and storage stability and offers a high optical density (OD) when used as an IJ aqueous pigment ink.

An object of the present invention is to provide an aqueous pigment dispersion for IJ inks that has excellent dispersion quality and is particularly suited for use as an IJ aqueous pigment ink. Another object of the present invention is to provide Y180 that exhibits excellent light fastness and storage stability and offers a high optical density (OD).

Solution to Problem

The inventors of the present invention carried out extensive studies and have consequently found that the dispersibility of Y180 can be enhanced by using a specific block copolymer as a resin for treating the surface of Y180 or as a dispersant resin for Y180, thus completing the present invention. Furthermore, after extensive studies, the inventors have found that treatment never before performed on Y180 can significantly enhance pigment properties such as storage stability, thereby completing the present invention.

The inventors studied extensively to make Y180 more suited for IJ aqueous pigment ink applications while focusing on the aspect ratio and the shorter diameter of pigment primary particles, and also on the crystallite size. As a result, the inventors have found that excellent optical density (OD), light fastness and storage stability are attained by controlling the above properties to fall in specific ranges, thus completing the present invention.

Specifically, the present invention pertains to:

Item 1. An aqueous pigment dispersion for ink-jet inks comprising C.I. Pigment Yellow 180, a block copolymer having an acid value of 10 or more and 20 or less and an amine value of 20 or less, and water.

Item 2. The aqueous pigment dispersion for ink-jet inks according to Item 1, wherein the block copolymer has a weight average molecular weight of 600 to 15,000.

Item 3. The aqueous pigment dispersion for ink-jet inks according to Item 1 or 2, wherein the block copolymer is a comb (graft) copolymer and includes a styrene skeleton and a maleic acid skeleton as a main chain, and a polyethylene glycol (PEG) skeleton as a side chain.

Item 4. An ink-jet aqueous pigment ink comprising the aqueous pigment dispersion according to any one of Items 1 to 3. Incidentally, the above aspects of the present invention (Items 1 to 4) described in this paragraph will be collectively referred to as the "first aspect" of the present invention.

Specifically, the present invention pertains to:

Item 5. C.I. Pigment Yellow 180 having an aspect ratio of 1.0 to 2.0, a primary particle shorter diameter of 30 to 100 nm, and a crystallite size of 15.0 nm or more as calculated from the Scherrer equation based on the full width at half maximum of a peak A indicated by a maximum diffraction intensity at a diffraction angle $2\theta=6.7\pm0.5°$ in a powder X-ray diffraction pattern of diffraction intensities versus $2\theta$ measured using CuK$\alpha$ radiation.

Item 6. An aqueous pigment dispersion for ink-jet inks comprising the C.I. Pigment Yellow 180 according to Item 5.

Item 7. An aqueous pigment dispersion for ink-jet inks comprising the C.I. Pigment Yellow 180 according to Item 5, a block copolymer having an acid value of 10 or more and 20 or less and an amine value of 20 or less, and water.

Item 8. An ink-jet aqueous pigment ink comprising the aqueous pigment dispersion for ink-jet inks according to Item 6 or 7. Incidentally, the above aspects of the present invention (Items 5 to 8) described in this paragraph will be collectively referred to as the "second aspect" of the present invention.

Advantageous Effects of Invention

The aqueous pigment dispersion for IJ inks according to the "first aspect" of the present invention has a very small pigment particle size, is excellent in dispersion quality, and has an excellent balance between color strength and light fastness, thus finding suitable use in IJ ink applications.

Furthermore, the IJ aqueous pigment ink of the present invention has advantageous side effects, namely, can be suitably used in a high-definition IJ printer equipped with an inorganic oxide IJ head made of $SiO_2$. IJ printers designed for high-definition printing often use a MEMS-processed inorganic oxide such as $SiO_2$ to construct an IJ head with a microscopic structure. The conventional aqueous pigment dispersions for IJ inks contain alkali metal hydroxides for the purpose of dissolving dispersant resins and thus may deteriorate the IJ heads made of $SiO_2$. The aqueous pigment ink of the present invention does not basically require the use of an alkali metal hydroxide and is therefore free from the risk of deteriorating the inorganic oxide such as $SiO_2$ used in the IJ heads.

The Y180 according to the "second aspect" of the present invention, particularly when used as an aqueous pigment dispersion for IJ ink, exhibits excellent storage stability and also satisfies all the properties required for IJ inks such as optical density (OD) and light fastness.

DESCRIPTION OF EMBODIMENTS

Hereinbelow, the present invention will be described in detail. In the present invention, Y180 does not simply mean the compound represented by [Chem. 1] described later, but does mean a pigment composed of the compound. The term "pigment" is used as a concept that not only indicates the crystal structure of the pigment, but also includes primary particles formed by aggregation or collection of the crystal, and further comprehends physical properties of the aggregates or the collections caused by the surface state of the primary particles or other factors.

The "first aspect" of the present invention will be described first.

[Aqueous Pigment Dispersions for IJ Inks]

It suffices if an aqueous pigment dispersion for IJ inks according to the "first aspect" of the present invention includes Y180, a block copolymer having an acid value of 10 or more and 20 or less and an amine value of 20 or less, and water. The block copolymer may be mixed at the stage of producing a pigment composition including the pigment and the dispersant resin, or may be mixed at the downstream stage of producing the aqueous pigment dispersion. In any case, the state of mixing of the Y180 and the block copolymer is not particularly limited, and the mixture may be a simple dispersion or the block copolymer may be adsorbed on the Y180. The block copolymer may partially or completely cover the Y180.

As described hereinabove, the aqueous pigment dispersion for IJ inks of the present invention is preferably substantially free from alkali metal hydroxides that may deteriorate the IJ head material, $SiO_2$. In the present invention, "substantially" means that the substance is not added intentionally, and the content of the substance is, for example, less than 1 mass %.

The Y180 is a yellow pigment that has CAS No. 77804-81-0 and is represented by the chemical formula below. It suffices if the pigment dispersion for IJ inks of the present invention includes the Y180 as a colorant, and may include a pigment other than the Y180, or a dye as long as the advantageous effects of the present invention are not impaired.

[Chem. 1]

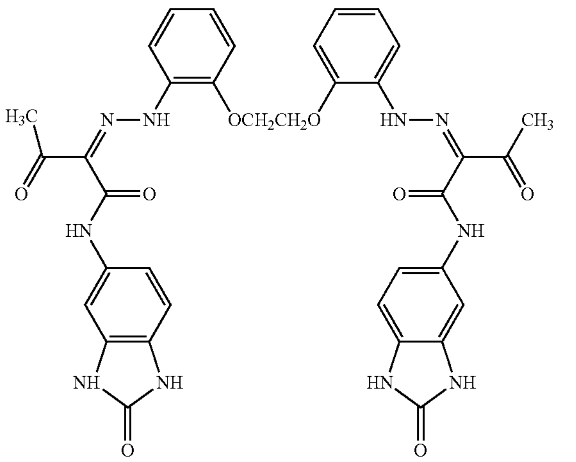

The Y180 may be obtained by adding an aqueous sodium nitrite solution to 1,2-bis(2-aminophenoxy)-ethane in the presence of a strong acid while performing ice cooling to perform a diazotization reaction, and coupling the resultant bisdiazonium salt solution to 5-acetoacetylamino-benzimidazolone. The Y180 of the "first aspect" of the present invention may be a commercial product to be used as it is. As the commercial product, "SYMULER FAST YELLOW BY 2000GT" (manufactured by DIC CORPORATION) or the like can be used.

The aqueous pigment dispersion for IJ inks of the "first aspect" of the present invention may include a yellow pigment other than the Y180, or a dye. Examples of such yellow pigments include azo pigments, disazo pigments, azomethine pigments, anthraquinone pigments, quinophthalone pigments, benzimidazolone pigments, isoindoline pigments, quinacridone pigments and perinone pigments. Specific examples thereof include C.I. Pigment Yellows 1, 2, 3, 12, 13, 14, 16, 17, 20, 23, 24, 34, 35, 37, 53, 55, 73, 74, 75, 81, 83, 86, 93, 95, 97, 98, 100, 101, 104, 108, 109, 110, 114, 117, 120, 125, 128, 129, 137, 138, 139, 147, 148, 150, 151, 153, 154, 155, 166, 168, 185 and 213. A dye or a pigment other than the above yellow pigments may be added. In the aqueous pigment dispersion for IJ inks of the "first aspect" of the present invention, the Y180 preferably represents 50 mass % or more, and more preferably 60 mass % or more of the total of the pigments.

The content of the pigment (the total content when two or more pigments are contained) in the aqueous pigment dispersion for IJ inks of the "first aspect" is, for example, 8 to 50 mass %, and preferably 10 to 20 mass %.

The block copolymer of the "first aspect" has an acid value of 8 or more and 25 or less (preferably 10 or more and 20 or less) and an amine value of 25 or less (preferably an amine value of 0 or more and 20 or less), and acts as a dispersant resin to help the Y180 being dispersed in the pigment dispersion for IJ inks of the present invention. The block copolymer as a dispersant resin is probably adsorbed easily to the Y180, allowing the Y180 to be dispersed stably. Preferably, the block copolymer is a comb (graft) copolymer and includes a styrene skeleton and a maleic acid skeleton as a main chain, and a polyethylene glycol (PEG) skeleton as a side chain.

The weight average molecular weight (Mw) of the block copolymer of the "first aspect" is, for example, 600 to 15,000, and preferably 600 to 12,000. When the weight average molecular weight is in the above range, wetting properties and dispersion stability can be enhanced. The weight average molecular weight (Mw) can be calculated with a GPC device in terms of polystyrenes as standard substances.

In the aqueous pigment dispersion for IJ inks of the "first aspect", the content of the block copolymer (nonvolatile component) is preferably 5 to 50 parts by mass, and more preferably 10 to 40 parts by mass with respect to 100 parts by mass of the pigment. The content of the block copolymer (nonvolatile component) is preferably 3 to 40 mass %, and more preferably 5 to 35 mass % of the whole (nonvolatile components) of the pigment dispersion for IJ ink. When the content of the block copolymer is in the above range, the dispersibility of the Y180 may be further enhanced.

A dispersant (a dispersant resin) other than the block copolymer may be used in the aqueous pigment dispersion for IJ inks of the "first aspect". Examples of the dispersants include copolymers (for example, block copolymers, random copolymers and graft copolymers) composed of at least two monomers selected from monomers including styrene and derivatives thereof, vinyl naphthalene and derivatives thereof, aliphatic alcohol esters of α,β-ethylenically unsaturated carboxylic acids, acrylic acid and derivatives thereof, maleic acid and derivatives thereof, itaconic acid and derivatives thereof, fumaric acid and derivatives thereof, vinyl acetate, vinyl alcohol, vinylpyrrolidone and acrylamide.

Where necessary, a pigment derivative (a synergist) may be used in the aqueous pigment dispersion for IJ inks of the "first aspect". Examples of the pigment derivatives include those pigment derivatives having the above-described organic pigment as a skeleton, and a substituent added to the skeleton of the pigment. Specifically, azo pigment derivatives, disazo pigment derivatives, azomethine pigment derivatives, anthraquinone pigment derivatives, quinophthalone pigment derivatives, benzimidazolone pigment derivatives, isoindoline pigment derivatives, quinacridone pigment derivatives and perinone pigment derivatives can be used. Examples of the derivatizing moieties include hydroxy groups, carboxylic acid groups and sulfonic acid groups. Two or more dissimilar derivatives can be used in combination.

The block copolymer to be added to the aqueous pigment dispersion for IJ inks may be mixed at the stage of producing the pigment composition, or may be mixed at the stage of producing the pigment dispersion. Details in the former case are as described hereinabove.

When the block copolymer is mixed at the stage of producing the aqueous pigment dispersion, the block copolymer may be in any form and may be mixed in any manner without limitation. The block copolymer in a form known to those skilled in the art can be mixed by a known mixing method.

The block copolymer is usually liquid and may be used as such or after being diluted with a solvent.

The block copolymer may be mixed in a conventionally known manner, for example, may be admixed before the pigment is dispersed or may be admixed after the pigment is dispersed. In particular, it is preferable to admix the block copolymer before the pigment is dispersed.

In the aqueous pigment dispersion for IJ inks of the "first aspect", the content of the block copolymer (nonvolatile component) is preferably 5 to 50 parts by mass, and more preferably 10 to 40 parts by mass with respect to 100 parts by mass of the pigment. The content of the block copolymer (nonvolatile component) is preferably 0.5 to 10 mass %, and more preferably 1 to 8 mass % of the whole of the aqueous pigment dispersion. When the content of the block copolymer is in the above range, the dispersibility of the Y180 can be further enhanced.

The aqueous pigment dispersion for IJ inks of the "first aspect" may contain a water-soluble organic solvent together with water. Examples of the water-soluble organic solvents include alcohols such as methanol, ethanol, propanol, isopropanol (2-propanol), n-butanol, isobutanol, 1,2-hexanediol and 1,6-hexanediol, ketones such as acetone and methyl ethyl ketone, polyalkylene glycols such as ethylene glycol, diethylene glycol and propylene glycol, polyalkylene glycol alkyl ethers, and lactams such as N-methyl-2-pyrrolidone. The organic solvents can be used singly, or two or more can be used in combination.

The content of the water-soluble organic solvent in the mass of the whole of the aqueous pigment dispersion for IJ inks of the "first aspect" is about 0 to 60%, and preferably 0 to 45%. The balance excluding the pigment dispersion for IJ inks (nonvolatile components) is water.

[IJ Aqueous Pigment Inks]

An IJ aqueous pigment ink of the "first aspect" of the present invention may include a yellow pigment other than the Y180, or a dye. Examples of such yellow pigments include azo pigments, disazo pigments, azomethine pigments, anthraquinone pigments, quinophthalone pigments, benzimidazolone pigments, isoindoline pigments, quinacridone pigments and perinone pigments. Specific examples thereof include C.I. Pigment Yellows 1, 2, 3, 12, 13, 14, 16, 17, 20, 23, 24, 34, 35, 37, 53, 55, 73, 74, 75, 81, 83, 86, 93, 95, 97, 98, 100, 101, 104, 108, 109, 110, 114, 117, 120, 125, 128, 129, 137, 138, 139, 147, 148, 150, 151, 153, 154, 155, 166, 168, 185 and 213. A dye or a pigment other than the above yellow pigments may be added. When a yellow pigment other than the Y180, or a dye is added, the mixing method is not particularly limited. Such an additional yellow pigment or a dye may be added as the pigment composition at the stage of producing the aqueous pigment dispersion, or may be added as the pigment dispersion at the stage of producing the IJ aqueous pigment ink. In the IJ ink aqueous pigment ink of the "first aspect" of the present invention, the Y180 preferably represents 10 mass % or more, and more preferably 20 mass % or more of the total of the pigments.

The IJ aqueous pigment ink can contain an additive as required. Examples of the additives include antiseptics, pH adjustors, chelating reagents, antirust agents, water-soluble UV absorbers, water-soluble polymer compounds, antioxidants, water-dispersible resins and surfactants. Examples of the surfactants include anionic surfactants, cationic surfactants, nonionic surfactants, amphoteric surfactants, silicone surfactants and fluorine surfactants. Water or a water-soluble organic solvent may be further added to control the ink concentration of the aqueous pigment ink.

Meanwhile, the IJ aqueous pigment ink is preferably substantially free from alkali metal hydroxides. The content of an alkali metal hydroxide is preferably less than 1 mass %, more preferably less than 0.1 mass %, particularly preferably less than 0.01 mass %, and most preferably nil.

The content of the additive (the total content when two or more kinds of additives are contained) in the mass of the whole of the IJ aqueous pigment ink of the "first aspect" is about 0 to 30%, and preferably 0 to 15%. The content of the pigment in the aqueous pigment ink is, for example, 1 to 15 mass %, and preferably 2 to 10 mass %.

To enhance the storage stability of the ink, the viscosity (25° C.) of the IJ aqueous pigment ink of the "first aspect" is preferably 1 to 30 mPa·s, and more preferably 2 to 20 mPa·s. To attain a further enhancement in storage stability of the ink, the pH of the aqueous pigment ink is, for example, 7.0 or more, and preferably 7.5 or more. From the points of view of material resistance and skin irritation, the pH is, for example, 11.0 or less, and preferably 10.0 or less.

The IJ aqueous pigment ink of the "first aspect" of the present invention can be loaded onto a known IJ recording device and can be ejected as ink droplets onto a recording medium to record a printout such as an image. Examples of the IJ recording devices include continuous ink-jet types (such as charge control type and spray type) and drop-on-demand types (such as piezoelectric type, thermal type and electrostatic suction type). The aqueous pigment ink of the present invention can be used in any type of device.

Next, the "second aspect" of the present invention will be described.

[C.I. Pigment Yellow 180]

Y180 according to the "second aspect" of the present invention has an aspect ratio of 1.0 to 2.0, a primary particle shorter diameter of 30 to 100 nm, and a crystallite size of 15.0 nm or more as calculated from the Scherrer equation based on the full width at half maximum of a peak A indicated by a maximum diffraction intensity at a diffraction angle 2θ=6.7±0.5° in a powder X-ray diffraction pattern of diffraction intensities versus 2θ measured using CuKα radiation.

Usually, a pigment exhibits higher light fastness with increasing particle size, and offers a higher optical density (OD) with decreasing particle size. That is, the concurrent satisfaction of optical density (OD) and light fastness requires two contradictory conditions regarding the particle size. Thus, there is a trade-off between the optical density (OD) and the light fastness. However, the Y180 according to the "second aspect" of the present invention is characterized in that the optical density (OD) and the light fastness are concurrently satisfied by designing the size of the pigment particles so that the aspect ratio and the primary particle shorter diameter fall in the specific ranges, and further by controlling the crystallite size related to the crystallinity of particles to fall in the specific range. Furthermore, ultrafine particles are excluded, thus offering excellent storage stability.

The aspect ratio is 1.0 to 2.0, preferably 1.0 to 1.7, and more preferably 1.0 to 1.5. When the aspect ratio is in this range, the size of aggregates of the pigment particles can be reduced, and consequently the pigment attains excellent storage stability when used as an aqueous pigment dispersion for IJ inks or as an IJ ink.

The primary particle shorter diameter is 30 to 100 nm, preferably 30 to 80 nm, and more preferably 30 to 50 nm. When the primary particle shorter diameter is in this range, the particle size of the pigment in a dispersion/ink can be reduced, and consequently the pigment offers an excellent optical density (OD) when used as an aqueous pigment dispersion for IJ inks or as an IJ ink.

The longer diameter of the primary particles is preferably such that the aspect ratio and the shorter diameter are in the above ranges, and is, for example, 30 to 150 nm, preferably 30 to 100 nm, and more preferably 30 to 80 nm. The shorter diameter and the longer diameter of the primary particles, and the aspect ratio calculated from these diameters can be determined by observing the primary particles of the pigment with a device such as an electron microscope, and averaging the lengths of, for example, 100 particles.

The crystallite size calculated from the Scherrer equation based on the full width at half maximum of the peak A is 15.0 nm or more (for example, 15.0 to 100 nm), preferably 18.0 nm or more, and more preferably 20.0 nm or more. A crystallite size closer to the primary particle size (the shorter diameter) is more preferable. When the crystallite size is in the above range, the pigment has good crystallinity of the primary particles, and consequently attains excellent light fastness when used as an aqueous pigment dispersion for IJ inks or as an IJ ink.

Similarly to the peak A, when a peak of a maximum diffraction intensity at 2θ=19.4±0.5° is referred to as a peak B, the crystallite size calculated from the Scherrer equation based on the full width at half maximum of the peak B is, for example, 6.0 nm or more, preferably 8.0 nm or more, and more preferably 10.0 nm or more. Similarly to the case of the peak A, the pigment attains higher light fastness when used as an aqueous pigment dispersion for IJ inks or as an IJ ink with increasing magnitude of this value.

The Scherrer equation is $D=K\lambda/B\cos\theta$ where D: the crystallite size (nm), K: the Scherrer constant, λ: the X-ray wavelength (nm), B: the broadening of diffraction line width (rad), and θ: the Bragg angle (rad). As described hereinabove, in the powder X-ray diffraction pattern of diffraction intensities versus the diffraction angle 2θ measured using CuKα radiation, and the peak of the maximum diffraction intensity at 2θ=6.7±0.5° is referred to as the peak A. The crystallite size (D) at 6.7° can be calculated from the Scherrer equation based on the full width at half maximum of the peak. The X-ray diffractometer (XRD) is not particularly limited, and may be, for example, fully automated multipurpose X-ray diffractometer Empyrean (manufactured by Malvern Panalytical Ltd.).

The Y180 according to the "second aspect" of the present invention can be produced by performing a specific treatment on a general synthesized product obtained by adding an aqueous sodium nitrite solution to 1,2-bis(2-aminophenoxy)-ethane in the presence of a strong acid while performing ice cooling to perform a diazotization reaction, and coupling the resultant bisdiazonium salt solution to 5-acetoacetylamino-benzimidazolone; or on a commercial product such as "SYMULER FAST YELLOW BY 2000GT" (manufactured by DIC CORPORATION).

For example, the specific treatment is carried out by frictionally crushing 100 parts by mass of the pigment (the crude pigment) with 200 to 1,000 parts by mass of an inorganic salt in the presence of a solvent (solvent salt milling) while performing heating. By conducting grinding in the presence of a solvent while performing heating, the primary particle size can be controlled to the specific range while enhancing the degree of crystallinity of the pigment.

A water-soluble inorganic salt can be suitably used as the inorganic salt described above. For example, such an inorganic salt as sodium chloride, potassium chloride or sodium sulfate is preferably used. Furthermore, it is more preferable to use an inorganic salt having an average particle size of 0.5 to 50 μm. Such an inorganic salt may be obtained easily by finely pulverizing a usual inorganic salt. For example, the inorganic salt is used in an amount of 200 to 1,000 parts by mass, and preferably 300 to 800 parts by mass with respect to 100 parts by mass of the pigment. While a larger amount of the inorganic salt is more preferable to finely pulverize the pigment particles, the amount in the present invention preferably falls in the above range from the point of view of the balance with the degree of crystallinity.

The solvent described above is preferably an organic solvent capable of suppressing the crystal growth. As such an organic solvent, a water-soluble organic solvent can be suitably used. For example, diethylene glycol (DEG), glycerin, ethylene glycol, propylene glycol, liquid polyethylene glycol, liquid polypropylene glycol, 2-(methoxymethoxy) ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, or the like can be used. In particular, diethylene glycol (DEG) is particularly preferable because this solvent allows the heating to be performed at an appropriate temperature and also can wet the pigment sufficiently. The amount in which the solvent is used is, for example, 10 to 500 parts by mass, and preferably 50 to 300 parts by mass with respect to 100 parts by mass of the pigment to ensure an appropriate viscosity during the grinding.

The grinding (solvent salt milling) is performed by adding the pigment, the inorganic salt, and the solvent that does not dissolve the above materials into a kneading machine, and kneading the mixture in the kneading machine. The kneading machine that can be used here may be, for example, a kneader, Trimix, Mix Muller or other devices. For example, the heating temperature during the grinding (solvent salt milling) is 50 to 100° C., and preferably 60 to 90° C. The heating temperature can be changed appropriately with a temperature controller provided on the kneading machine. The time of grinding (solvent salt milling) is, for example, 2 to 10 hours, and preferably 3 to 8 hours.

[Aqueous Pigment Dispersions for IJ Inks]

An aqueous pigment dispersion for IJ inks of the "second aspect" of the present invention is not particularly limited as long as including the Y180 according to the "second aspect" described hereinabove. The aqueous pigment dispersion for IJ inks of the "second aspect" of the present invention preferably includes a block copolymer having an acid value of 10 or more and 20 or less and an amine value of 20 or less, and water in addition to the Y180. The block copolymer is the same as described hereinabove in the "first aspect". The pigment may be a combination of the Y180 according to the "second aspect", and other usual Y180 or other yellow pigment.

In the aqueous pigment dispersion for IJ inks according to the "second aspect", the content of the block copolymer (nonvolatile component) is preferably 5 to 50 parts by mass, and more preferably 10 to 40 parts by mass with respect to 100 parts by mass of the pigment. The content of the block copolymer (nonvolatile component) is preferably 3 to 40 mass %, and more preferably 5 to 35 mass % of the whole (nonvolatile components) of the pigment dispersion for IJ ink. When the content of the block copolymer is in the above range, the dispersibility of the Y180 can be further enhanced.

Similarly to the "first aspect", a dispersant (a dispersant resin) other than the block copolymer may be used in the aqueous pigment dispersion for IJ inks of the "second aspect". In addition, a pigment derivative (a synergist) may be used as required. Similarly to the "first aspect", the aqueous pigment dispersion for IJ inks of the "second aspect" may include a water-soluble organic solvent together with water. The content of the water-soluble organic solvent in the mass of the whole of the aqueous pigment dispersion for IJ inks of the "second aspect" is about 0 to 60%, and preferably 0 to 45%. The balance excluding the pigment dispersion for IJ inks (nonvolatile components) is water.

[IJ Aqueous Pigment Inks]

An IJ aqueous pigment ink of the "second aspect" of the present invention includes the aqueous pigment dispersion for ink-jet inks according to the "second aspect" described hereinabove. The IJ aqueous pigment ink of the "second aspect" may include a yellow pigment other than the Y180 described in the "first aspect", or a dye. In the IJ ink aqueous pigment ink of the "second aspect", the Y180 according to the "second aspect" preferably represents 10 mass % or more, and more preferably 20 mass % or more of the total of the pigments.

Similarly to the "first aspect" described hereinabove, an additive can be contained in the IJ aqueous pigment ink of the "second aspect" as required. Similarly to the "first aspect" described hereinabove, the viscosity (25° C.) of the IJ aqueous pigment ink of the "second aspect" is preferably 1 to 30 mPa·s, and more preferably 2 to 20 mPa·s to enhance the storage stability of the ink. Similarly to the "first aspect" described hereinabove, the IJ aqueous pigment ink of the "second aspect" can be loaded onto a known IJ recording device and can be ejected as ink droplets onto a recording medium to record a printout such as an image.

EXAMPLES

Hereinbelow, the present invention will be described in greater detail based on Examples and Comparative Examples.

The "first aspect" of the present invention will be described first.

Aqueous pigment dispersions for IJ inks prepared by the process described in Formulation A below (Examples 1 to 4, and Comparative Examples 1 to 7), and aqueous pigment dispersions for IJ inks prepared by the process described in Formulation B below (Reference Examples 1 to 3) were subjected to the measurement of dispersed particle size described below to evaluate the dispersibility. The outlines of these examples and the results of dispersibility are listed in Table 1 below.

(Formulation A: No Alkali Metal Hydroxides Added)

The dispersant resin described in Table 1, and ion-exchanged water were added to 4.0 g of the pigment as listed in Table 1 so that the total amount of the aqueous pigment dispersion would be 20.0 g. The dispersant resin that was used contained water and an aqueous solvent as well as a nonvolatile component corresponding to a resin. Thus, the amount in which the ion-exchanged water was added was controlled assuming that the dispersant resin would contain 0.8 g of the nonvolatile component. Subsequently, 1 mm glass beads were added to the aqueous pigment dispersion, and the pigment was dispersed using a paint conditioner for 90 minutes. Ion-exchanged water was further added to control the nonvolatile content to 15 mass %.

(Formulation B: Alkali Metal Hydroxide Added)

To 4.0 g of the pigment as listed in Table 1 were added 1.9 g of the dispersant resin as listed in Table 1, 0.5 g of an aqueous potassium hydroxide solution, 0.9 g of isopropyl alcohol and 12.7 g of ion-exchanged water. Thus, an aqueous pigment dispersion in a total amount of 20.0 g was prepared. Subsequently, 1 mm glass beads were added to the aqueous pigment dispersion, and the pigment was dispersed using a paint conditioner for 90 minutes. Ion-exchanged water was further added to control the nonvolatile content to 15 mass %.

[Measurement of Dispersed Particle Size]

The aqueous dispersions for IJ inks were each analyzed with a particle size distribution analyzer (Nanotrac UPA-EX150 manufactured by MicrotracBEL Corp.), and the average dispersed particle size Mv was calculated.

TABLE 1

| | Pigment | Dispersant resin Type | Acid value | Amine value | Formulation | Mv |
|---|---|---|---|---|---|---|
| Example 1 | Y180 | Copolymer (1) | 10 | 0 | A | 207 |
| Example 2 | Y180 | Copolymer (2) | 10 | 0 | A | 212 |
| Example 3 | Y180 | Copolymer (3) | 20 | 20 | A | 240 |
| Example 4 | Frictionally crushed Y180 | Copolymer (1) | 10 | 0 | A | 158 |
| Comparative Example 1 | Y74 | Copolymer (1) | 10 | 0 | A | 369 |
| Comparative Example 2 | Y155 | Copolymer (1) | 10 | 0 | A | 295 |
| Reference Example 1 | Y180 | Copolymer (4) | 167 | 0 | B | 262 |
| Reference Example 2 | Y74 | Copolymer (4) | 167 | 0 | B | 224 |
| Reference Example 3 | Y155 | Copolymer (4) | 167 | 0 | B | 203 |
| Comparative Example 3 | Y180 | Copolymer (5) | 0 | 0 | A | 585 |
| Comparative Example 4 | Y180 | Copolymer (6) | 7 | 7 | A | 375 |
| Comparative Example 5 | Y180 | Copolymer (7) | 30 | 20 | A | 4,431 |
| Comparative Example 6 | Y180 | Copolymer (8) | 75 | 0 | A | 712 |
| Comparative Example 7 | Y180 | Copolymer (9) | 0 | 40 | A | 1,284 |

Pigments

Y180 . . . Product name: PV FAST YELLOW HG 01 (manufactured by CLARIANT K.K.)

Y74 . . . Product name: FAST YELLOW 7426 (manufactured by Sanyo Color Works, LTD.)

Y155 . . . Product name: INK JET YELLOW 4GC (manufactured by CLARIANT K.K.)

Frictionally crushed Y180: The Y180 above was frictionally crushed using sodium chloride in an amount 5 times the mass of the pigment (the pigment obtained in Example 5 of the "second aspect" described later).

Dispersant Resins

Copolymer (1) . . . Block copolymer, product name: DISPERBYK-190 (Mw: approximately 11,000, manufactured by BYK-Chemie GmbH)

Copolymer (2) . . . Block copolymer, product name: DISPERBYK-2015 (Mw: approximately 9,000, manufactured by BYK-Chemie GmbH)

Copolymer (3) . . . Block copolymer, product name: DISPERBYK-2010 (Mw: approximately 700, manufactured by BYK-Chemie GmbH)

Copolymer (4) . . . Styrene-(meth)acrylic acid copolymer (nonvolatile content: 45%, Mw: approximately 5,600)

Copolymer (5) . . . Block copolymer, product name: DISPERBYK-192 (Mw: approximately 1,000, manufactured by BYK-Chemie GmbH)

Copolymer (6) . . . Block copolymer, product name: DISPERBYK-2012 (Mw: approximately 8,500, manufactured by BYK-Chemie GmbH)

Copolymer (7) . . . Block copolymer, product name: DISPERBYK-191 (Mw: approximately 500, manufactured by BYK-Chemie GmbH)

Copolymer (8) . . . Block copolymer, product name: DISPERBYK-194N (Mw: approximately 1,800, manufactured by BYK-Chemie GmbH)

Copolymer (9) . . . Block copolymer, product name: DISPERBYK-2055 (Mw: approximately 2,700, manufactured by BYK-Chemie GmbH)

The weight average molecular weights (Mw) described above are values determined with GPC device [HLC-8320GPC (manufactured by TOSOH CORPORATION)] using columns [TSKgel guard column HxL-H (guard column)+TSKgel GMHxL+TSKgel GMHxL+TSKgel GMHxL+TSKgel GMHxL (manufactured by TOSOH CORPORATION)] in terms of polystyrenes as standard substances.

In Example 1, the block copolymer added to the Y180 had an acid value of 10 and an amine value of 0. This block copolymer was also added to the Y74 in Comparative Example 1 and the Y155 in Comparative Example 2. The comparison of the dispersibility (Mv) between Example 1, and Comparative Examples 1 and 2 indicates that Example 1 achieved a better value than Comparative Examples 1 and 2. Thus, it has been demonstrated that the block copolymer according to the present invention is effective for enhancing the dispersibility of Y180. Furthermore, Example 3 indicates that the dispersibility is effectively enhanced also by adding a block copolymer having an acid value of 20 and an amine value of 20. From Comparative Examples 3 to 7, the dispersibility is poor when the copolymer used fails to satisfy an acid value of 10 or more and 20 or less and an amine value of 20 or less. These results indicate that the dispersibility can be specifically enhanced by using Y180 in combination with a block copolymer having an acid value of 10 or more and 20 or less and an amine value of 20 or less. Furthermore, the comparison of the dispersibility between Example 1 and Example 4 indicates that grinding of Y180 is effective for further enhancing the dispersibility. The frictionally crushed Y180 is Y180 according to the "second aspect".

While Reference Examples 1 to 3 realized comparable levels of dispersibility to Examples 1 to 3, Formulation B involves an alkali metal hydroxide that, as described hereinabove, and there is a risk that $SiO_2$ as an IJ head material may be damaged. Thus, it can be said that the aqueous dispersions for IJ inks of Reference Examples 1 to 3 are undesirable in view of this fact.

Next, the "second aspect" of the present invention will be described.

A Y180 pigment (a crude pigment) was obtained by the process of Production Example 1 below and was subsequently treated by any of the processes of Examples 5 to 7 and Comparative Example 8. Properties of the pigments with or without the treatment were as listed in Table 2 below. Furthermore, aqueous pigment dispersions for IJ inks were prepared using the treated or untreated pigment and were evaluated. The evaluation results of the aqueous pigment dispersions for IJ inks and aqueous IJ inks are listed in Table 3 below.

(Method for Measuring the Crystallite Size)

The crystallite size of samples obtained in Production Example and Examples was calculated in the following manner. The sample powder was loaded into a measurement cell. The measurement surface was smoothed by compressing the powder with a finger from the side opposite from the measurement surface. The measurement cell was set in an X-ray diffractometer, and scanning was performed at a rate of 2θ/sec=0.02. A diffraction pattern was thus obtained. Peaks were searched (minimum significance: 1.00, minimum peak tip: 0.20, maximum peak tip: 1.00, peak base width: 2.00) and were fitted using analysis software "High Score" attached to the X-ray diffractometer, thus determining the diffraction angles and the full width at half maximums of the respective diffraction peaks. Here, the full width at half maximum of each peak was determined by halving the sum of values obtained from the left half and the right half of the diffraction peak. The crystallite size of each peak was calculated from the Scherrer equation assuming that the Scherrer constant K was 0.90 and the X-ray wavelength A was 0.154 nm, and also based on θ calculated from the diffraction angle of the peak and the full width at half maximum B.

Production Example 1: Synthesis of Pigment

In 3,300 parts of water, 225 parts of 1,2-bis(2-aminophenoxy)-ethane was dispersed, and then 538.5 parts of 35% hydrochloric acid was added. Ice was added. While keeping the temperature at 5° C. or below, 337 parts of a 40% aqueous sodium nitrite solution was added dropwise. A diazo component was thus prepared. Next, 455 parts of 5-acetoacetylamino-benzimidazolone was dispersed in 3,400 parts of water, and then 595 parts of a 25% aqueous sodium hydroxide solution was added and dissolved. A coupler component was thus obtained. The amounts of the diazo component and the coupler component were adjusted to 6,500 parts and 4,500 parts, respectively, by adding water and ice. To 6,500 parts of water, 30.6 parts of 90% acetic acid was added, and then the temperature of this solution is controlled to 20° C. The coupler component was added dropwise to adjust the pH to 6.0, and thereafter the diazo component was added dropwise at a constant rate. To make sure that the diazonium salt would not be present in excess in the acetic acid solution, the dropwise addition of the coupler component was started at the same time as dropping of the diazo solution. The coupling was performed while adjusting the pH of the acetic acid solution to 6.0 through control of the dropping rate of the coupler component. During the coupling, ice or a 5% sodium hydroxide solution was added at appropriate times to keep the temperature at 20° C. and the pH at 6.0. The coupling completed in about 3 hours. The system was heated to 90° C., held at the temperature for 1 hour, and filtered. The residue was washed with water. The thus-obtained wet cake was dried at 90° C. The resultant solid was pulverized with a juicer mixer to give a yellow powder as a Y180 pigment (a crude pigment).

Example 5: Grinding Treatment

Into 15-L Trimix (TM; manufactured by INOUE MFG., INC.), 500 parts of the yellow powder obtained in Production Example 1, 2,500 parts of salt and 500 parts of diethylene glycol were added and the mixture was frictionally crushed for 5 hours while setting the temperature controller to keep the internal temperature at 80° C. to 100° C. The frictionally crushed pigment composition was added into warm water at 50° C., and the mixture was re-slurried sufficiently by stirring. The slurry was filtered, and the residue was washed with water. The thus-obtained wet cake was dried at 90° C. The resultant solid was pulverized with a juicer mixer to give a yellow powder.

Example 6: Grinding Treatment

A yellow powder was obtained in the same manner as the production process of Example 5, except that the amounts were changed to 750 parts of the yellow powder, 2,250 parts of the salt, and 750 parts of diethylene glycol.

Example 7: Grinding Treatment

A yellow powder was obtained in the same manner as the production process of Example 5, except that the 2 L Trimix was replaced by a 2 L kneader (KN; manufactured by YOSHIDA SEISAKUSHO CO., LTD.), and that the amounts were changed to 150 g of the yellow powder from Production Example 1, 750 g of the salt, and 150 g of diethylene glycol.

Comparative Example 8: Solvent Treatment

To a 1-L autoclave vessel, 160 parts of the wet cake obtained in the course of the process of Production Example 1, 180 parts of isobutanol and 240 parts of water were added and the mixture was heated at 130° C. for 5 hours. The slurry thus obtained was filtered. The residue was thoroughly washed with water. The thus-obtained wet cake was dried at 90° C. The resultant solid was pulverized with a juicer mixer to give a yellow powder.

TABLE 2

| | Sample | Aspect ratio | Primary particle diameters [nm] (shorter, longer) | Peak A crystallite size [nm] (6.7°) | Peak B crystallite size [nm] (19.4°) |
|---|---|---|---|---|---|
| Example 5 | Grinding treatment | 1.3 | 35, 46 | 23.7 | 10.0 |
| Example 6 | Grinding treatment | 1.7 | 53, 90 | 27.9 | 11.8 |
| Example 7 | Grinding treatment | 1.7 | 41, 70 | 23.1 | 9.3 |
| Production Example 1 | Synthesized product | 2.2 | 41, 90 | 14.0 | 4.5 |
| Comparative Example 8 | Solvent treatment | 4.0 | 54, 215 | 22.9 | 10.4 |

Next, aqueous pigment dispersions for IJ inks containing the pigments from Production Example 1, Examples 5 to 7 and Comparative Example 8 were prepared by the process described in Formulation A' or Formulation B' below (whether the formulation was A' or B' is listed in Table 3). The dispersions thus prepared, which represented Examples 8 to 11 and Comparative Examples 9 to 11, were subjected to the following evaluations.

(Formulation A': No Alkali Metal Hydroxides Added)

To 4.0 g of the pigment were added 2.0 g of a block copolymer as a dispersant resin [product name: DISPERBYK-190 (Mw: approximately 11,000, acid value: 10, active component: 40 mass %, manufactured by BYK-Chemie GmbH)] and 14.0 g of ion-exchanged water. Thus, an aqueous pigment dispersion in a total amount of 20.0 g was prepared. The dispersant resin that was used contained a nonvolatile resin component, and also water and an aqueous solvent. Thus, the amount in which the ion-exchanged water was added was controlled assuming that the dispersant resin contained 0.8 g of the nonvolatile component. Subsequently, 1 mm glass beads were added to the aqueous pigment dispersion, and the pigment was dispersed using a paint conditioner for 90 minutes. Ion-exchanged water was further added to control the nonvolatile content to 15 mass %.

(Formulation B': Alkali Metal Hydroxide Added)

To 4.0 g of the pigment were added 1.78 g of a styrene-(meth)acrylic acid copolymer as a dispersant resin (acid value: 167, active component: 45 mass %), 0.43 g of a 25 mass % aqueous potassium hydroxide solution, 1.02 g of isopropyl alcohol and 22.77 g of ion-exchanged water. Thus, an aqueous pigment dispersion in a total amount of 30.0 g was prepared. Subsequently, 1 mm glass beads were added to the aqueous pigment dispersion, and the pigment was dispersed using a paint conditioner for 90 minutes. Ion-exchanged water was further added to control the nonvolatile content to 15 mass %.

[Evaluation: Storage Stability]

The aqueous pigment dispersions for IJ inks obtained by the above process were each analyzed with an E-type viscometer TV-25 (manufactured by Toki Sangyo Co., Ltd.) to measure the viscosity. The dispersions were allowed to stand in a thermostatic chamber at 60° C. for 1 week, and the viscosity was measured in the same manner. The storage stability was evaluated based on the change in viscosity (viscosity ratio) from the viscosity before heating.

[Evaluation: Optical Density (OD)]

To 9.6 g of the aqueous pigment dispersion for IJ inks obtained by the above-described process were added 0.3 g of SURFYNOL 465 (product name, manufactured by Nissin Chemical Industry Co., Ltd.), 3.0 g of glycerin, 1.5 g of 1,2-hexanediol and 15.6 g of ion-exchanged water. Thus, an aqueous IJ ink in a total amount of 30.0 g was prepared. This aqueous IJ ink was loaded into a cartridge of commercial business printer PX-105 (manufactured by Seiko Epson Corporation) and was printed on Canon photo paper, glossy gold (A4 size, model number: GL-101A4100, manufactured by Canon Inc.). A region printed with 100% print coverage rate was analyzed with colorimeter X-Rite eXact (manufactured by X-Rite Inc.) to measure the Y value as the optical density (OD).

[Evaluation: Light Fastness]

Of the printout prepared for the evaluation of optical density (OD), a region printed with 75% print coverage rate was exposed to UV light for 100 hours using UV fade meter U48H (manufactured by Suga Test Instruments Co., Ltd.). The quality of light fastness was evaluated based on ΔE before and after the irradiation.

TABLE 3

| | | | Dispersion | | | Printout | |
|---|---|---|---|---|---|---|---|
| | Pigment | Formulation | Viscosity before heating [mPa · s] | Viscosity after heating at 60° C. for 1 w [mPa · s] | Ratio of viscosities before and after heating [mPa · s] | Optical density (OD) | Light fastness ΔE |
| Example 8 | Example 5 | A' | 2.9 | 2.8 | 0.97 | 1.75 | 12 |
| Example 9 | | B' | 2.7 | 3.0 | 1.11 | 1.73 | 12 |
| Example 10 | Example 6 | A' | 2.5 | 2.5 | 1.00 | 1.69 | 10 |
| Example 11 | Example 7 | A' | 2.4 | 2.5 | 1.04 | 1.72 | 11 |
| Comparative Example 9 | Production Example 1 | A' | 4.0 | Gelation | Uncalculatable | 1.50 | 25 |
| Comparative Example 10 | | B' | 5.4 | | | 1.52 | 25 |
| Comparative Example 11 | Comparative Example 8 | A' | 2.6 | 2.5 | 0.96 | 1.29 | 7 |

From Table 3, the dispersions of Examples 8 to 11 that contained the Y180 according to the "second aspect" (Examples 5 to 7) had a small change in viscosity before and after heating, namely, high storage stability, and were thus demonstrated to be storable for a long period of time. In contrast, the dispersions of Production Examples 9 and 10 that contained the synthesized product (Production Example 1) were gelated after heating, namely, the storage stability of the pigment was poor and the pigment aggregated easily (because of gelation, the ratio of viscosities before and after heating could not be calculated). It has been demonstrated that the printouts that were formed using the dispersions of Examples 8 to 11 containing the Y180 according to the "second aspect" (Examples 5 to 7) had a higher optical density (OD) and also attained higher light fastness than Comparative Examples 9 and 10 in which the synthesized product (Production Example 1) was used. Furthermore, the dispersions of Examples 8 to 11 included the Y180 according to the "second aspect" (Examples 5 to 7), while the dispersion of Comparative Example 11 involved pigmentation carried out with isobutanol (Comparative Example 8). These dispersions did not differ widely in terms of the ratio of viscosities before and after heating. However, the printouts from the dispersions of Examples 8 to 11 attained an excellent balance between optical density (OD) and light fastness.

The invention claimed is:

1. An aqueous pigment dispersion for ink-jet inks comprising C.I. Pigment Yellow 180, a block copolymer having an acid value of 10 or more and 20 or less and an amine value of 20 or less, and water, wherein the block copolymer has a weight average molecular weight of 600 to 15,000, wherein the block copolymer is a comb (graft) copolymer and includes a styrene skeleton and a maleic acid skeleton as a main chain, and a polyethylene glycol (PEG) skeleton as a side chain.

2. An ink-jet aqueous pigment ink comprising the aqueous pigment dispersion according to claim 1.

* * * * *